Sept. 11, 1962  J. R. ZEILSTRA  3,053,575
METHOD FOR THE MANUFACTURE OF BRUSHWARE WITH
A METAL HOLDER IN WHICH THE FIBER TUFTS
CONSIST OF THERMOPLASTIC MATERIAL
Filed March 21, 1962
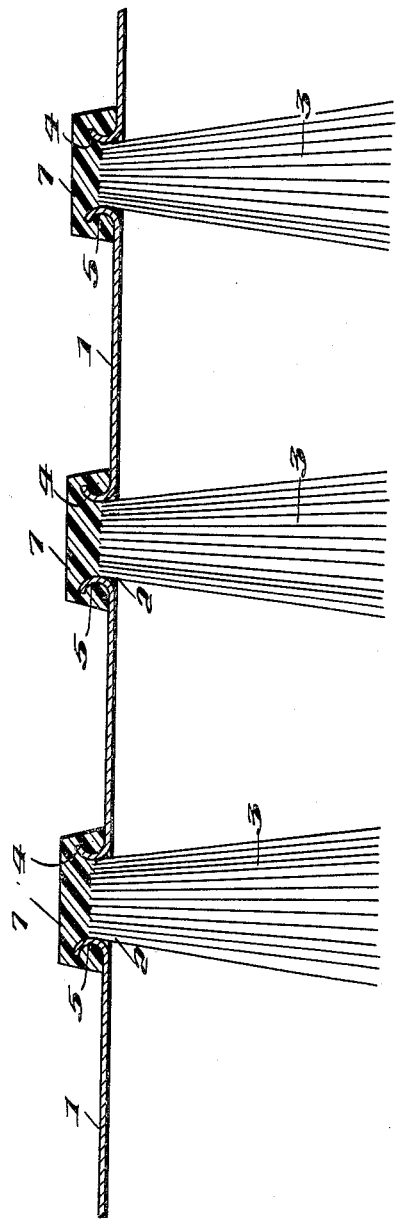
INVENTOR.
JAN ROMKES ZEILSTRA,
BY
Pierce, Scheffler & Parker
ATTORNEYS

3,053,575
METHOD FOR THE MANUFACTURE OF BRUSHWARE WITH A METAL HOLDER IN WHICH THE FIBER TUFTS CONSIST OF THERMOPLASTIC MATERIAL
Jan Romkes Zeilstra, Groningen, Netherlands
Filed Mar. 21, 1962, Ser. No. 181,262
1 Claim. (Cl. 300—21)

This application is a continuation-in-part of my co-pending application Serial No. 453,294, filed August 31, 1954, and relates to a method for the manufacture of brushware with a metal holder, which is equipped with openings into which the fibre tufts are inserted and the edges of which are beaded outwards through an angle of at least 90°, such as known from British patent specification No. 106,590. In this known method the fibre tufts are inserted with one end through the openings in the holder, whereafter these ends are coated with liquid rubber, said rubber subsequently being vulcanized.

According to the invention the fibre tufts consist of thermoplastic material and the fibres of each tuft are melted together at the inserted end so as to form a head, which engages about the exterior of the beaded edge or completely encloses said edge.

By means of the method according to the invention, the fibre tufts can be secured more firmly in the openings of the holder than by means of the known method. The method according to the invention is also better suited for mass production than the known method, in which liquid rubber has to be applied and vulcanized.

It is to be noted that brushware in which the fibre tufts consist of thermoplastic material is already known from U.S. patent specification No. 2,576,546. In the method for the manufacture of such brushware as known from this patent specification, however, the fibres of each fibre tuft are first melted together at one end so as to form a small head and are subsequently inserted with this head into a hole of a basis layer and glued therein.

The invention will be described more fully with reference to the drawing, which only shows by way of example an embodiment of a brush made according to the present invention.

In making up a brush, one starts with a plate-like holder 1 preferably made of metal and which is provided with a plurality of spaced round openings 2 and each of which receives a tuft 3 of fibres made of thermoplastic material. The peripheries of the openings are flanged in the same direction and the edges of the flanges are turned outward to establish a peripheral recess thereunder. In the present embodiment, the openings are provided with convexly curved peripheral flanges 4, and the curvature of the flange is extended sufficiently to establish thereunder a concavely curved peripheral recess 5.

In accordance with the improved method, the end portion of each thermoplastic fibre tuft 3 is inserted through its corresponding opening 2 and projects beyond the flange. A heated die is then applied to the end of each tuft causing the thermoplastic to melt and reform into a head 7 which completely envelops the opening 2 and flange 4. It will be noted that a portion of the melted and reformed thermoplastic head 7 fills the recessed portion 5 beneath the flange 4 thus locking the head portion 7 of the fibre tuft 3 securely in the opening 2 and preventing the tuft from being loosened in either direction longitudinally of itself.

It can be determined experimentally for the various kinds of thermoplastic material what the temperature of the die and the duration of the melting for the formation of the head should be.

The higher the temperature chosen, the shorter the time during which the die has to be pressed against the end of the fibre tuft. The time also depends to some extent on the shape of the die. Thus, when a die with a mandrel-shaped part in the centre is used, owing to the better contact with the fibrous material the duration of the melting is shorter than when a flat die is used.

By way of example it may be stated that when a flat die is used, the duration of the melting for polyvinyl chloride is 1 min. to 30 sec. at die temperatures of 310–330° F.; for polyamide the duration is 1 min. to 20 sec. at die temperatures of 460–540° F.; for cellulose acetate butyrate the duration is 40 to 20 sec. at die temperatures of 300–320° F.

I claim:
In the method of manufacturing a brush having a tuft holder plate, the steps of forming in said plate a plurality of mutually spaced openings which extend through the same, the periphery of each said opening being flanged and the edge portion of said flange being turned outward to establish a peripheral recess thereunder, inserting the end portion of a tuft of thermoplastic fibers into and through each said plate opening so that said end portion projects beyond the flange thereof, and heating to fusion and die forming the said projecting end portions of said tufts into corresponding discrete integral head portions which respectively envelop said openings and the flanges thereof and fill the said recesses under said flanges, said tufts being secured in place within their respective openings in said holder plate solely by the interlocking action between said die-formed head portions and said flanges.

References Cited in the file of this patent

UNITED STATES PATENTS

| | | |
|---|---|---|
| 1,946,653 | Wein | Feb. 13, 1934 |
| 2,283,293 | Steiert | May 19, 1942 |
| 2,341,823 | Smith | Feb. 15, 1944 |
| 2,576,546 | Starr | Nov. 27, 1951 |
| 2,652,580 | Neugass | Sept. 22, 1953 |